US012711294B2

(12) United States Patent
Hong et al.

(10) Patent No.: US 12,711,294 B2
(45) Date of Patent: Aug. 18, 2026

(54) SIMULATION SYSTEM FOR A CYLINDRICAL 3-DIMENSIONAL SEMICONDUCTOR DEVICE USING A HYBRID MESH AND METHOD THEREOF

(71) Applicant: Gwangju Institute of Science and Technology, Gwangju (KR)

(72) Inventors: Sung Min Hong, Gwangju (KR); Geon-Tae Jang, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 749 days.

(21) Appl. No.: 18/134,311

(22) Filed: Apr. 13, 2023

(65) Prior Publication Data

US 2024/0070360 A1 Feb. 29, 2024

(30) Foreign Application Priority Data

Aug. 29, 2022 (KR) ........................ 10-2022-0108236

(51) Int. Cl.
*G06F 30/3308* (2020.01)
*G06F 111/10* (2020.01)

(52) U.S. Cl.
CPC ...... *G06F 30/3308* (2020.01); *G06F 2111/10* (2020.01)

(58) Field of Classification Search
USPC .......................................................... 716/100
See application file for complete search history.

(56) References Cited

U.S. PATENT DOCUMENTS 5,812,435 A * 9/1998 Fujinaga ................. G06F 30/23 703/13
2014/0019101 A1 1/2014 Li
2018/0253514 A1* 9/2018 Bryant .................... G06F 30/20
2020/0242203 A1* 7/2020 Tanaka .................... G06F 30/20
2021/0110096 A1* 4/2021 Pu ......................... G06F 30/367
2024/0070360 A1* 2/2024 Hong .................... G06F 30/367

FOREIGN PATENT DOCUMENTS

KR 20140110336 A 9/2014
KR 20150087725 7/2015
KR 20210066545 6/2021
KR 20240029892 A * 3/2024 ............. G06F 30/23
KR 102661977 B1 * 4/2024 ............. G06F 30/23

* cited by examiner

*Primary Examiner* — Mohammed Alam
(74) *Attorney, Agent, or Firm* — CANTOR COLBURN LLP

(57) ABSTRACT

Provided is a semiconductor device simulation system and method. The simulation system includes; a device structure file input module configured to receive a plurality of device structure files for a plurality of sub-devices obtained by dividing a semiconductor device to be simulated; a connection relationship extraction module configured to extract connection relationships between the device structure files for the sub-devices; an interface condition application module configured to apply interface conditions to interface points of the device structure files according to the extracted connection relationships; and a simulation module configured to simulate an operation of the semiconductor device using the device structure files for the sub-devices and the interface conditions at interface points of adjacent sub-devices. The simulation system can simulate the semiconductor device using a plurality of device structure files for the sub-devices.

11 Claims, 8 Drawing Sheets

SIMULATION SYSTEM FOR A CYLINDRICAL 3-DIMENSIONAL SEMICONDUCTOR DEVICE USING A HYBRID MESH AND METHOD THEREOF

TECHNICAL FIELD

The present invention relates to a simulation system and method for a three-dimensional cylindrical semiconductor device with partially broken rotational symmetry. More specifically, the system is configured to divide the structure of the cylindrical semiconductor device into sub-devices according to rotational symmetry, generate 2D or 3D device structure files for the divided sub-devices, generate connection relationships between the device structure files for the sub-devices, and simulate the entire cylindrical semiconductor device by using the interface conditions according to the connection relationships for the sub-devices.

BACKGROUND ART

The semiconductor device simulation is a technology for predicting the performance of a semiconductor device using a computer program, and is essential to reduce time and cost in the semiconductor device development process. The semiconductor device simulator that performs the semiconductor device simulation is a numerical analysis program that calculates and outputs the electrical characteristics of the semiconductor device by solving the governing equations representing the movement of electrons and holes inside the semiconductor device in a numerical way. The electrical characteristics of the semiconductor device output by the semiconductor device simulator typically include an IV characteristic relationship. Since the governing equations considered in semiconductor device simulation are nonlinear, a complete solution cannot be obtained at once. For this reason, the semiconductor device simulator first assumes an approximate initial solution, and obtains a complete solution by iteratively improving the solution in the direction of reducing the error caused by the assumed initial solution.

In a conventional semiconductor device simulator, semiconductor device structure information and device structure file to be simulated are input by a user, and numerical analysis is performed based on the input data to provide simulation results for the corresponding semiconductor device.

The above-described device structure file is formed of a binary file including names of regions constituting a semiconductor device to be simulated, coordinate information of each vertex for a tetrahedron constituting each region, material information, impurity concentration information, and the like. And the device structure file is generated in a unique file format used by each semiconductor device simulator.

In general, the device structure file may be generated using a program called a structure generator or may be generated by a semiconductor process simulator. The structure generator includes a figure drawing program by which a user can draw various geometric figures. A user draws figures corresponding to the semiconductor device to be simulated using the figure drawing program of the structure generator and inputs the figures into the structure generator. The structure generator automatically generates a device structure file using information about corresponding figures. Meanwhile, when process conditions actually will be used for manufacturing are input from a user, the semiconductor process simulator performs a semiconductor process simulation, and generates and provides a device structure file as a result of the simulation. Although generating a device structure file using the semiconductor process simulator has the disadvantage that the process simulation process takes a lot of time, it has the advantage of being able to generate a device structure file having a device structure and impurity distribution close to reality.

Meanwhile, two types of semiconductor device structure files for 3D semiconductor devices are used. One of the 3D semiconductor device structure files is in the form of dividing a 3D space into several 3D basic figures (eg, tetrahedron). This is referred to as 'a 3D device structure file' in this specification, and is a commonly used form. The other of the semiconductor device structure files is a form in which a 3D space is expressed in a cylindrical coordinate system, and only the 2D space is divided into several 2D basic figures (eg, triangles) considering the rotational symmetry. This is referred to as 'a cylindrical device structure file' or 'a 2D device structure file' in this specification. The cylindrical device structure file is used for a structure having rotational symmetry, and since it is the same as a two-dimensional device structure file, an accurate solution can be obtained efficiently. A typical application of the cylindrical device structure file is a vertical NAND device.

However, when the cylindrical 3D device has a locally deformed structure to partially lose rotational symmetry, the cylindrical device structure file cannot be applied to the device and the 3D device structure file must be applied.

Recently, in a vertical NAND device, a technique such as a multi-stack process is sometimes applied to increase the degree of integration. The multi-stack process is a technique in which a first stack is formed to produce some of the devices of the NAND string, and then a second stack is formed thereon to produce the rest of the devices. In this case, the structure of each stack constituting one NAND string has rotational symmetry, but the structure at the region where the stacks meet is deformed and thus does not have rotational symmetry. As such, cylindrical device structure files cannot be applied for NAND strings that does not partially have rotational symmetry. Therefore, since a 3D device structure file must be applied to the NAND strings that does not partially have rotational symmetry, it is very inefficient.

FIG. 1 is a schematic diagram showing a structure in which rotational symmetry is partially broken by way of example. As shown in FIG. 1, the conventional semiconductor device simulator cannot use the cylindrical device structure file to simulate a 3D semiconductor device whose rotational symmetry is partially broken. Therefore, the conventional semiconductor device simulator has a problem in that a complicated 3D device structure file must be used to simulate a 3D semiconductor device with partially broken rotational symmetry.

SUMMARY OF THE INVENTION

An object of the present invention to solve the above problems is to provide a semiconductor device simulation system and method configured to efficiently simulate a cylindrical semiconductor device having partially broken rotational symmetry. The system and the method according to the present invention are characterized in that a cylindrical device structure file is applied to a part with rotation symmetry and a three-dimensional device structure file is applied to a part without rotation symmetry.

A 3D semiconductor device simulation system according to a first aspect of the present invention for achieving the above technical problem is comprising; a device structure file input module configured to receive a plurality of device structure files for a plurality of sub-devices obtained by dividing a semiconductor device to be simulated; a connection relationship extraction module configured to extract connection relationships between the device structure files for the sub-devices; an interface condition application module configured to apply interface conditions to interface points of the device structure files according to the extracted connection relationships; and a simulation module configured to simulate an operation of the semiconductor device using the device structure files for the sub-devices and the interface conditions at interface points of adjacent sub-devices. The 3D semiconductor device simulation system is configured to simulate the semiconductor device using a plurality of device structure files for the sub-devices.

In the 3D semiconductor device simulation system according to the first aspect described above, it is preferable that the semiconductor device is a three-dimensional (3D) cylindrical semiconductor device having a structure in which rotational symmetry is partially broken, and the plurality of device structure files input to the device structure file input module include at least one cylindrical device structure file and at least one 3D device structure file for the 3D cylindrical semiconductor device.

In the 3D semiconductor device simulation system according to the first aspect described above, it is preferable that the cylindrical device structure file is a device structure file for a sub-device with rotational symmetry of the 3D cylindrical semiconductor device, and the 3D device structure file is a device structure file for a sub-device without rotational symmetry of the 3D cylindrical semiconductor device.

In the 3D semiconductor device simulation system according to the first aspect described above, it is preferable that the connection relationships between the plurality of device structure files include information about the interface surfaces of the adjacent sub-devices, and are extracted by using the coordinate value information of the device structure files.

In the 3D semiconductor device simulation system according to the first aspect described above, it is preferable that the interface condition application module calculate equations for simulation for the sub-devices without considering the connection relationships, merge the calculated equations at interface points of interface surfaces for adjacent sub-devices to form a single equation, and solve the merged equations by applying the interface condition that all the interface point of the adjacent sub-devices have the same physical quantity.

A 3D semiconductor device simulation method according to a second aspect of the present invention comprising the following steps: (a) receiving a plurality of device structure files for a plurality of sub-devices obtained by dividing a semiconductor device to be simulated; (b) extracting connection relationships between a plurality of device structure files for the sub-devices; (c) applying interface conditions to interface points of the device structure files according to the extracted connection relationships; (d) simulating an operation of the semiconductor device using the device structure files for the sub-devices and the interface conditions at interface points of adjacent sub-devices; wherein the 3D semiconductor device simulation method is configured to simulate the semiconductor device using a plurality of device structure files for the sub-devices.

In the 3D semiconductor device simulation method according to the second aspect described above, it is preferable that the semiconductor device is a three-dimensional (3D) cylindrical semiconductor device whose rotational symmetry is partially broken, and the plurality of device structure files input to the device structure file input module include at least one cylindrical device structure file and at least one 3D device structure file for the 3D cylindrical semiconductor device.

In the 3D semiconductor device simulation method according to the second aspect described above, it is preferable that the cylindrical device structure file is a device structure file for a sub-device with rotational symmetry of the 3D cylindrical semiconductor device, and the 3D device structure file is a device structure file for a sub-device without rotational symmetry of the 3D cylindrical semiconductor device.

In the 3D semiconductor device simulation method according to the second aspect described above, it is preferable that the connection relationship between the plurality of device structure files include information about the interface surfaces of the adjacent sub-devices, and are extracted by using the coordinate value information of the device structure files.

In the 3D semiconductor device simulation method according to the second aspect described above, it is preferable that the step (d) comprises; calculating equations for simulation for the sub-devices without considering the connection relationships, merging the calculated equations at interface points of interface surfaces for adjacent sub-devices to form a single equation, and solving the merged equations by applying the interface condition that all the interface point of the adjacent sub-devices have the same physical quantity.

The 3D cylindrical semiconductor device simulation system according to the present invention having the above-described configuration, when the 3D cylindrical semiconductor device to be simulated has partially broken rotational symmetry, divides the entire semiconductor device according to rotational symmetry into a plurality of sub-devices, generates the cylindrical device structure files for the sub-devices with rotational symmetry, and generates 3D device structure files for the sub-devices without rotation symmetry. Therefore, it is possible to simulate very efficiently.

In addition, the 3D semiconductor device simulation system according to the present invention generates a connection relationship between the sub-devices using at least one or more 3D device structure files and at least one or more cylindrical device structure files, and applies interface conditions according to the connection relationships to perform simulation of the 3D semiconductor device.

DETAILED DESCRIPTION

Hereinafter, the configuration and operation of a three-dimensional cylindrical semiconductor device simulation system using a plurality of device structure files for the sub-devices according to a preferred embodiment of the present invention will be described in detail with reference to the accompanying drawings. The 3D semiconductor device simulation system 1 according to the present invention may be implemented as a program that can be executed on a computing device.

Figure 1:
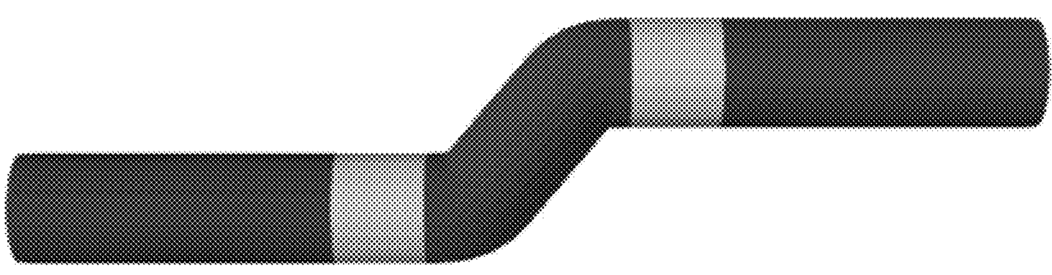
FIG. 1 is a schematic diagram showing a structure in which rotational symmetry is partially broken by way of example.
Figure 2:
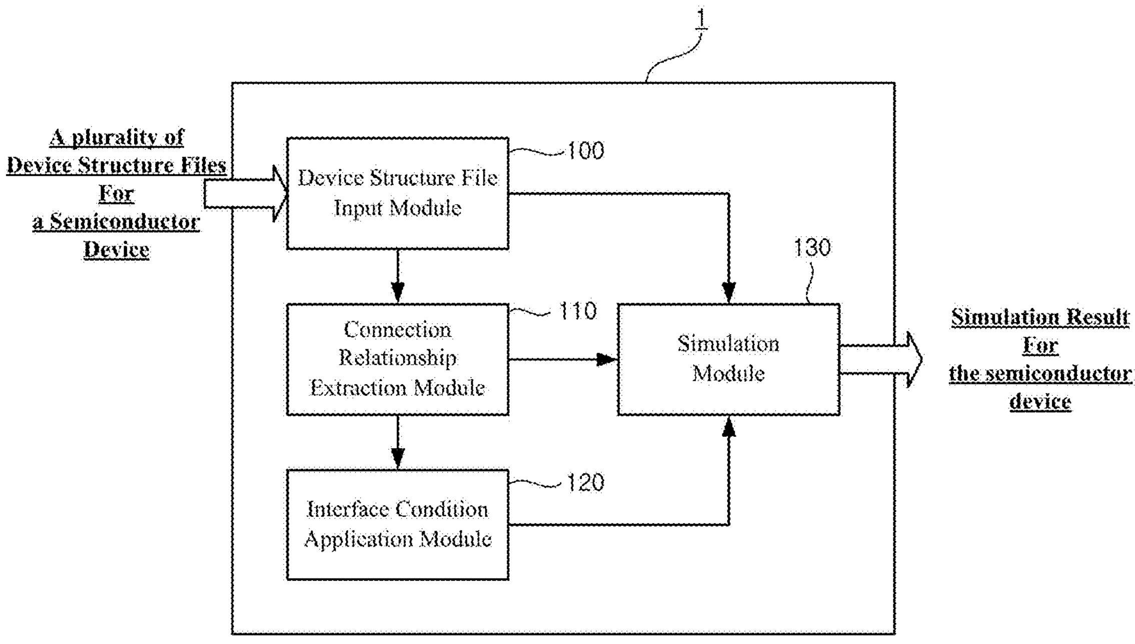
FIG. 2 is a configuration diagram schematically showing the structure of a 3D semiconductor device simulation system according to a preferred embodiment of the present invention.

FIG. 2 is a configuration diagram schematically showing the structure of a 3D semiconductor device simulation system according to the preferred embodiment of the present invention. Referring to FIG. 2, the 3D semiconductor device simulation system 1 according to the present invention includes a device structure file input module 100, a connection relationship extraction module 110, an interface condition application module 120, and a simulation module 130. The simulation system according to the present invention enables efficient simulation of a three-dimensional cylindrical semiconductor device whose rotational symmetry is partially broken.

Figure 3:
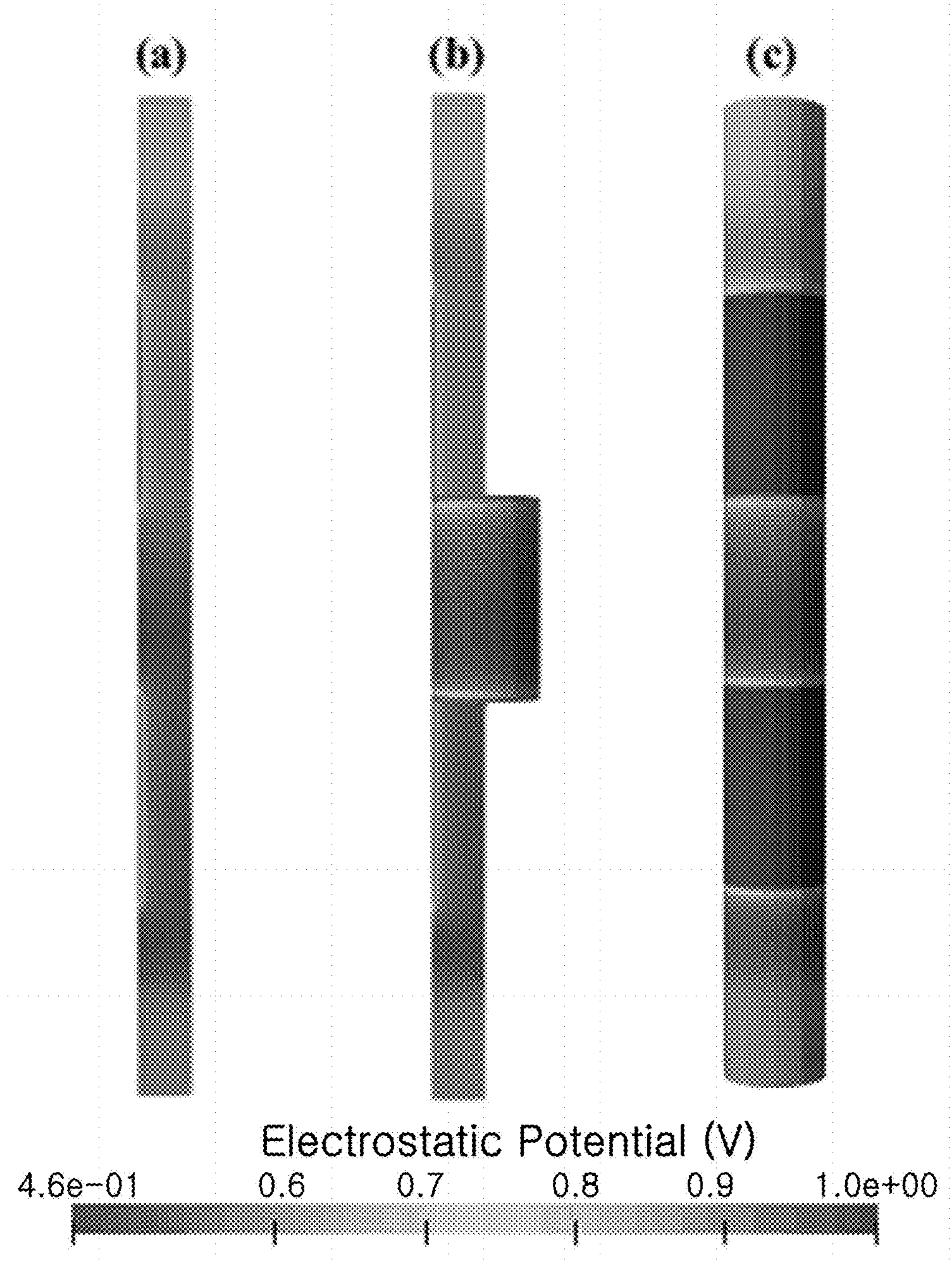
FIG. 3 illustrates representation methods for a 3D cylindrical semiconductor device structure by way of example.

FIG. 3 illustrates representation methods for a 3D cylindrical semiconductor device structure by way of example. As shown in (a) of FIG. 3, since the cylindrical structure can be generated by rotating the 2D cross section with respect to the axis of rotation, it can be represented as a 2D cross section. As shown in (c) of FIG. 3, the cylindrical structure can also be represented in three dimensions. In addition, as shown in (b) of FIG. 3, part of the cylindrical structure can be expressed in 3D and another part can be expressed in 2D cross section. Therefore, in the simulation system according to the present invention, as shown in (b) of FIG. 3, a method of expressing part of the cylindrical structure in 3D and the other part in 2D section is proposed.

The device structure file input module 100 is configured to receive a plurality of device structure files for a plurality of sub-devices obtained by dividing one semiconductor device from the outside. The device structure file input module 100 may be configured to directly receive a plurality of device structure files for a semiconductor device from a user or to be input from another external system.

When a semiconductor device to be simulated is a three-dimensional cylindrical semiconductor device whose rotational symmetry is partially broken, the entire device structure is divided into a plurality of sub-devices according to the presence or absence of rotational symmetry. Cylindrical device structure files are generated for the sub-devices having rotational symmetry, and 3D device structure files are generated for the sub-devices without rotational symmetry. The device structure files may be generated through an external structure generator or the like. At least one or two or more cylindrical device structure files and at least one or two or more 3D device structure files generated for the divided sub-devices are input through the device structure file input module.

The connection relationship extraction module 110 extracts connection relationships between a plurality of device structure files for the sub-devices by using coordinate values in a 3D space included in the input device structure files. Meanwhile, the cylindrical device structure file is a two-dimensional device structure file using a cylindrical coordinate system, and the three-dimensional device structure file uses a three-dimensional Cartesian coordinate system. Accordingly, when the sub-devices using the cylindrical coordinate system and the sub-devices using the 3D Cartesian coordinate system meet each other, one point of the cylindrical coordinate system may overlap several points of the 3D Cartesian coordinate system. Considering these conditions, the connection relationships between cylindrical device structure files and 3D device structure files for each sub-device are extracted.

The interface condition applying module 120 is configured to apply interface conditions to interface points for the adjacent sub-devices according to the extracted connection relationships. Hereinafter, a process of applying an interface conditions by an interface condition application module will be described in detail. Two interface points associated with each other by the connection relationship are spatially the same point, but are included in different sub-devices, and thus two variables are assigned in equations for simulation. For these two interface points, equations for simulation are calculated for sub-devices without considering each other. Next, after adding the solved equations without considering the connection relationships. Next, the calculated equations at interface points of interface surfaces for adjacent sub-devices are merged to form a single equation. Next, the merged equations are resolved by applying the interface condition that all the interface point of the adjacent sub-devices have the same physical quantity.

The simulation module 130 is configured to simulate an operation of the semiconductor device using the device structure files for the sub-devices and the interface conditions at interface points of adjacent sub-devices.

The simulation system according to the present invention having the above-described structure is configured to efficiently simulate a three-dimensional cylindrical semiconductor device having partially broken rotational symmetry by using a plurality of device structure files which include at least a cylindrical device structure file and at least a 3D device structure file.

Hereinafter, a simulation method implemented by the simulation system according to the present invention having the above configuration will be described in detail. The simulation method according to the present invention may be implemented by a computing system constituting the simulation system.

In the simulation method according to the present invention, at first, a plurality of device structure files for a plurality of sub-devices which are obtained by dividing a three-dimensional cylindrical semiconductor device structure with partially broken rotational symmetry are received from the outside. Here, at least one or two or more cylindrical device structure files and at least one or two or more three-dimensional device structure files generated for the sub-devices are input through the device structure file input module.

Next, a connection relationship between a plurality of device structure files for the sub-devices are extracted by using the 3D coordinate values included in the input device structure files.

Next, equations for simulation for the sub-devices are calculated without considering the connection relationships. Next, the calculated equations at interface points of interface surfaces for adjacent sub-devices are merged to form a single equation. And then, the merged equations are resolved by applying the interface condition that all the interface point of the adjacent sub-devices have the same physical quantity.

Next, a simulation of the semiconductor device is performed using the device structure files for the sub-devices and the interface conditions at interface points of adjacent sub-devices;

According to the above-described method, the 3D semiconductor device can be simulated by using a plurality of device structure files for the sub-devices. In particular, it is possible to efficiently simulate a three-dimensional cylindrical semiconductor device having partially broken rotational symmetry.

The simulation system and method according to the present invention described above can obtain an accurate solution by setting suitable interface conditions even when the cylindrical device structure and the three-dimensional device structure are mixed.

Figure 4:
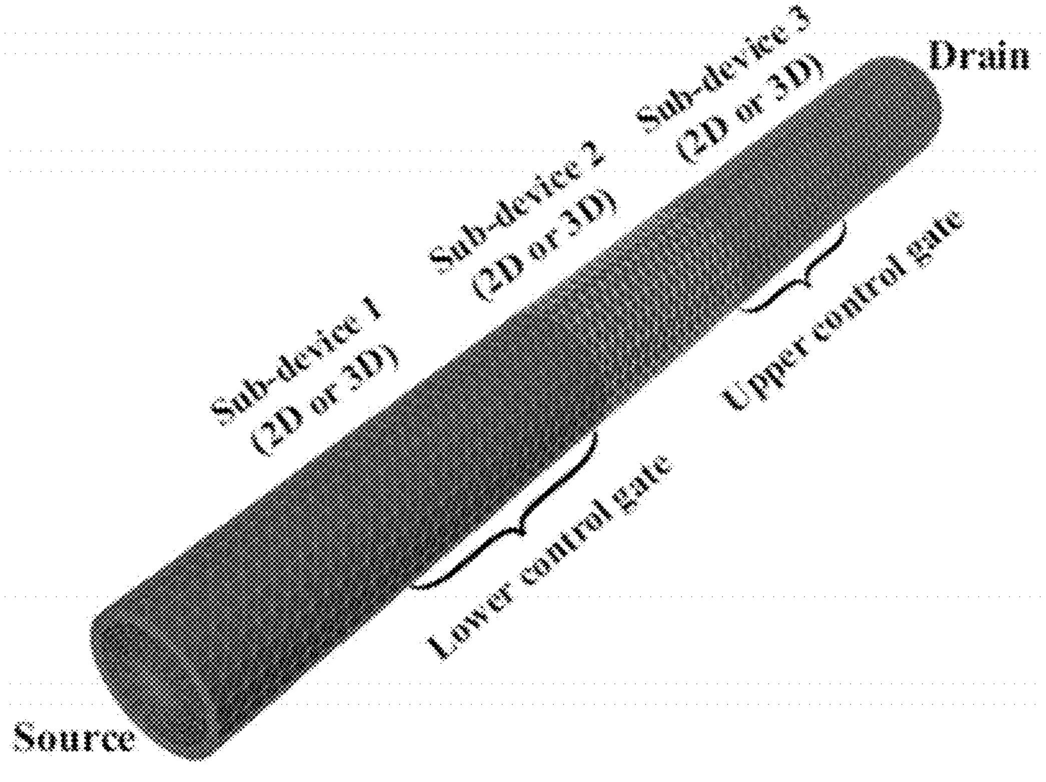
FIG. 4 is a schematic diagram illustratively showing a state in which a 3D cylindrical semiconductor device to be simulated is divided into three sub-devices in the 3D cylindrical semiconductor device simulation system according to the preferred embodiment of the present invention.

FIG. 4 is a schematic diagram illustratively showing a state in which the structure of a 3D cylindrical semiconductor device to be simulated is divided into three sub-devices in the 3D cylindrical semiconductor device simulation system according to the preferred embodiment of the present invention. And, FIG. 5 is a graph showing the drain current according to simulation results for eight cases in which a semiconductor device consisting of three sub-devices is represented as a cylindrical or three-dimensional device structure in the 3D cylindrical semiconductor device simulation system according to the preferred embodiment of the present invention.

Figure 5:
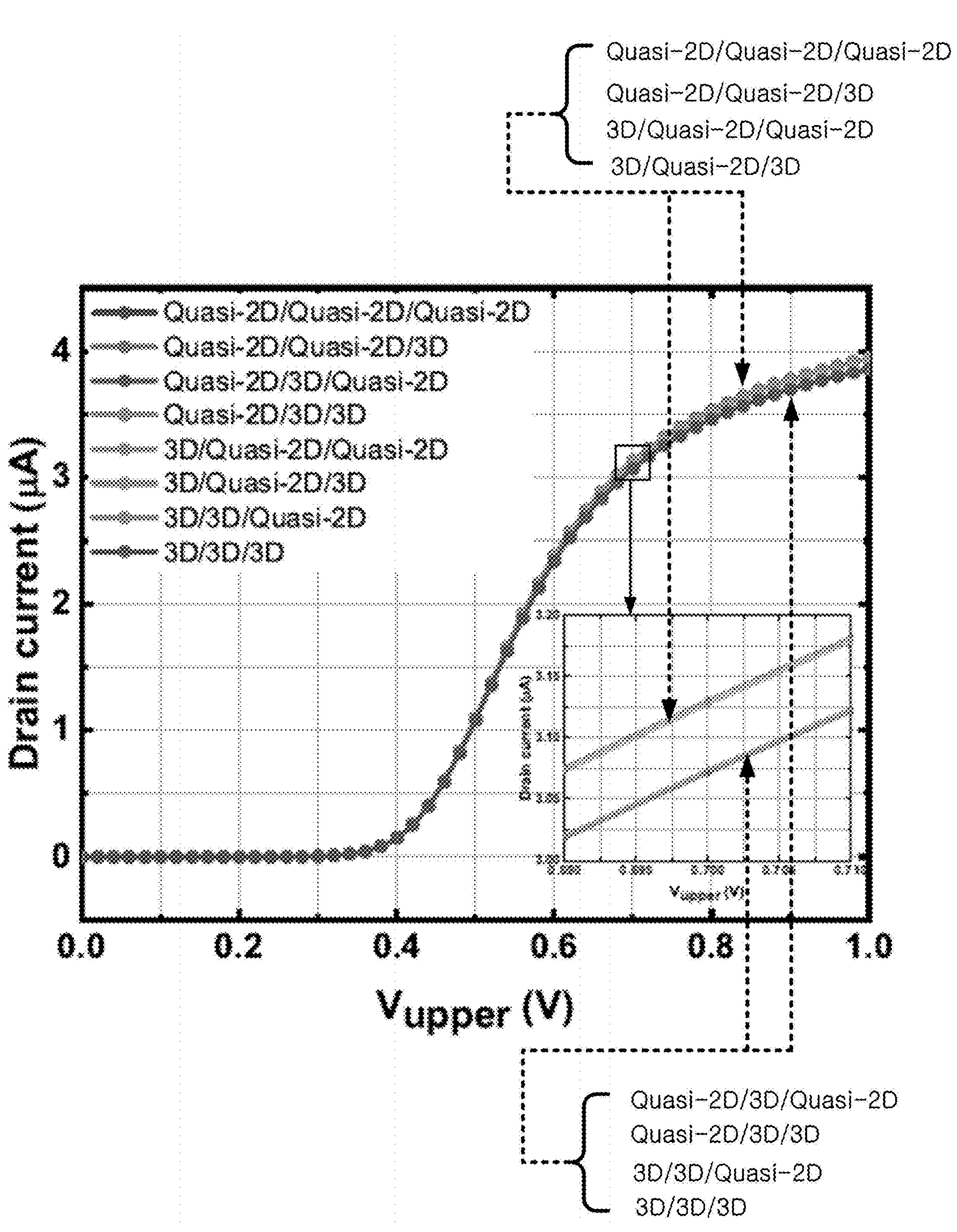
FIG. 5 is a graph showing the drain current according to simulation results for eight cases in which a semiconductor device consisting of three sub-devices is represented as a cylindrical or three-dimensional device structure in the 3D cylindrical semiconductor device simulation system according to the preferred embodiment of the present invention.

Referring to FIGS. 4 and 5, eight cases of a semiconductor device composed of three sub-devices are (1) cylindrical device structure (Quasi-2D)/cylindrical device structure (Quasi-2D)/cylindrical device structure (Quasi-2D), (2) Cylindrical device structure (Quasi-2D)/Cylindrical device structure (Quasi-2D)/3D device structure (3D), (3) Cylindrical device structure (Quasi-2D)/3D device structure (3D))/Cylindrical device structure (Quasi-2D), (4) Cylindrical device structure (Quasi-2D)/3D device structure (3D)/3D device structure (3D), (5) 3D device structure (3D)/Cylindrical device structure (Quasi-2D)/Cylindrical device structure (Quasi-2D), (6) 3D device structure (3D)/Cylindrical device structure (Quasi-2D)/3D device structure (3D), (7) 3D device structure (3D)/3D device structure (3D)/Cylindrical device structure (Quasi-2D), and (8) 3D device structure (3D)/3D device structure (3D)/3D device structure (3D). Referring to FIG. 5, it can be seen that all the above eight cases show similar calculation results.

Figure 6:
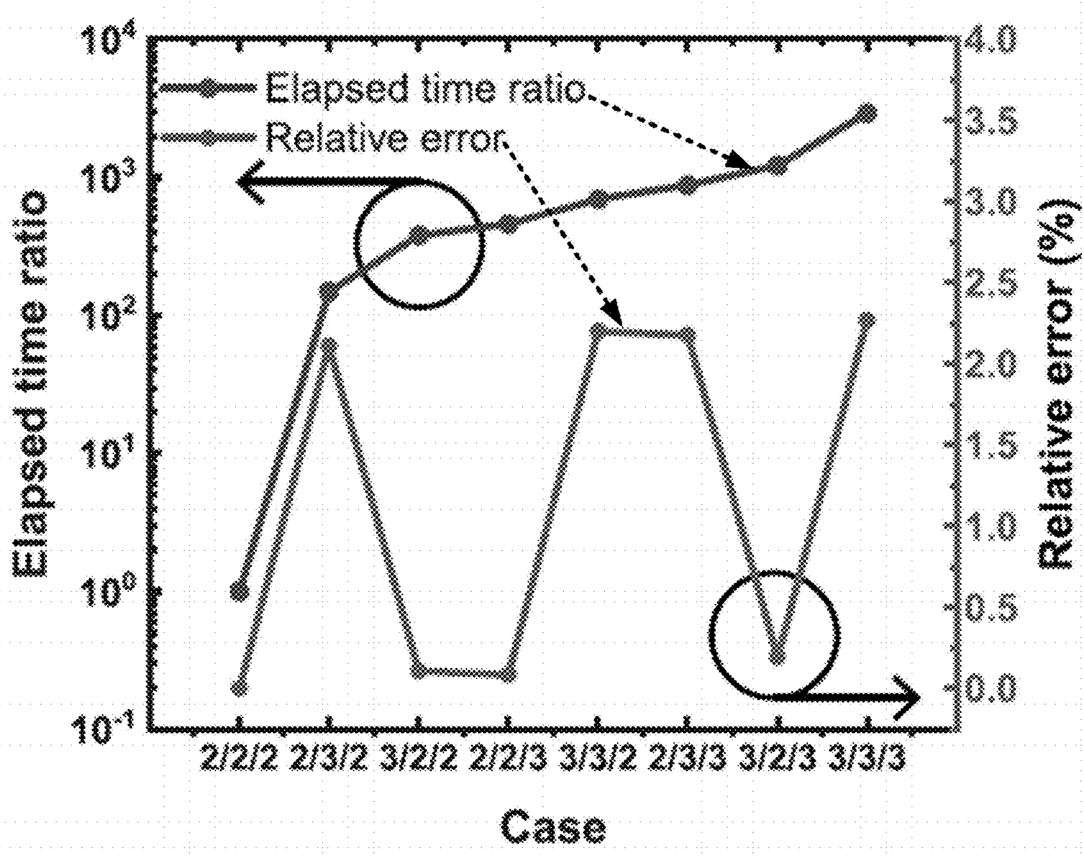
FIG. 6 is a graph showing the simulation time (i.e. elapsed time ratio) and the relative error for the eight cases of FIG. 5 to explain the performance of the system with respect to computational efficiency in the 3D cylindrical semiconductor device simulation system according to the preferred embodiment of the present invention.

FIG. 6 is a graph showing the simulation time (i.e. elapsed time ratio) and the relative error for each of the eight cases of FIG. 5 to explain the performance of the system with respect to computational efficiency in the 3D cylindrical semiconductor device simulation system according to the preferred embodiment of the present invention. Looking at the simulation time (i.e. Elapsed time ratio) for each case with reference to FIG. 6, the most simulation time is consumed when the semiconductor device is made of 3D device structures (for example, 3D/3D/3D structure), and when only a part of the semiconductor device is made of a 3D device structure (for example, 2D/3D/2D structure), it can be seen that the simulation time is greatly reduced. On the other hand, looking at the relative error for each case with reference to FIG. 6, the maximum error is about 2%.

Referring to FIG. 6, in terms of simulation time and error, it can be seen that the case where only a part of a 3D cylindrical semiconductor device is simulated as a 3D device structure according to the present invention is more efficient than the case where the entire 3D cylindrical semiconductor device is simulated as a 3D device structure.

Figure 7:
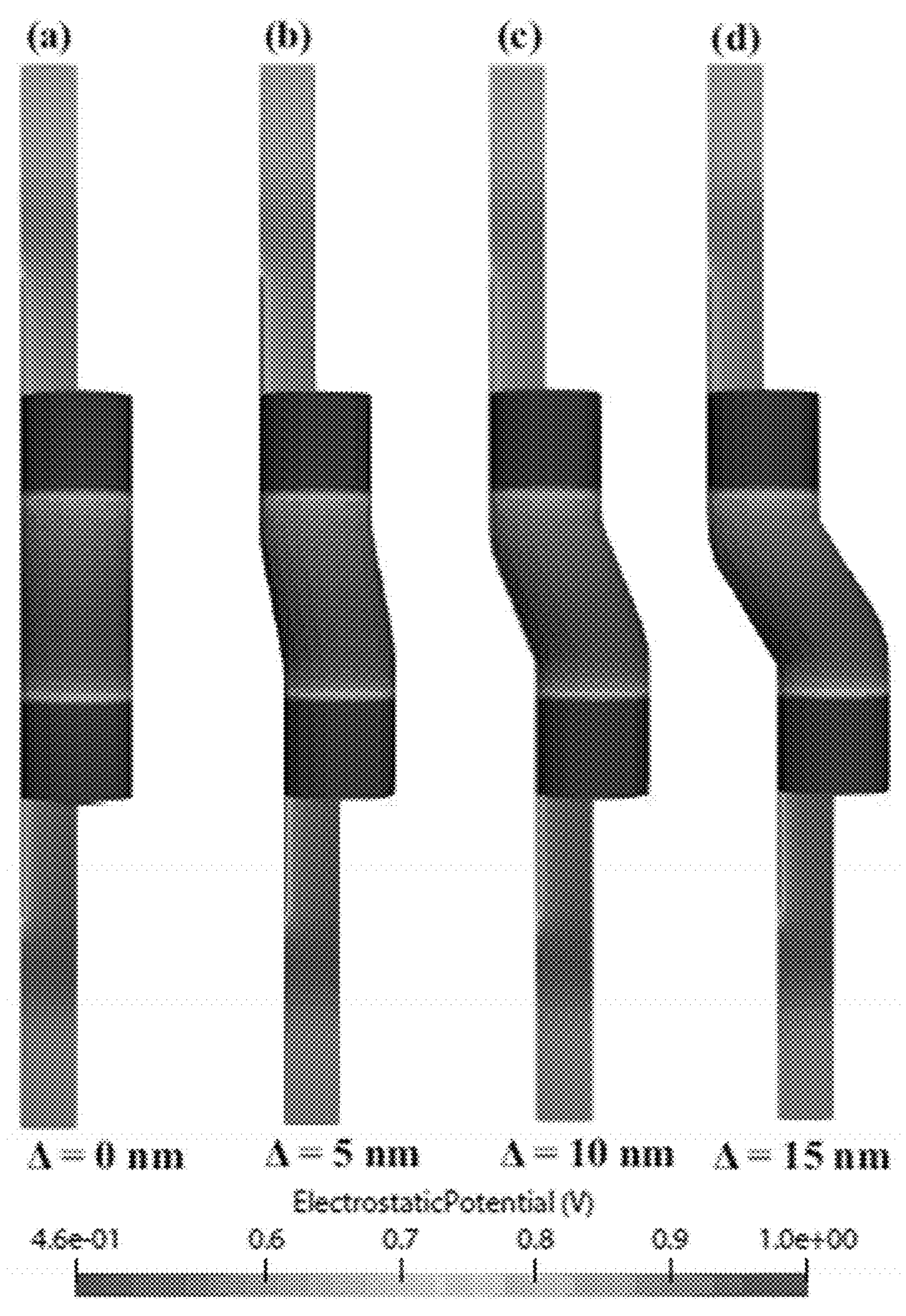
FIG. 7 is schematic diagrams illustrating vertical NAND structures having different degrees of bending in order to show performance in the 3D cylindrical semiconductor device simulation system according to the preferred embodiment of the present invention.

FIG. 7 is schematic diagrams illustrating vertical NAND structures having different degrees of bending in order to show performance in the 3D cylindrical semiconductor device simulation system according to a preferred embodiment of the present invention. Referring to FIG. 7, cases in which offsets representing the degrees of bending of NAND devices are 0, 5, 10, and 15 nm are illustrated, respectively. For the case where the offset is not 0, the conventional technique has to be applied as a simulation method using a 3D device structure file. Thus, the conventional technique has been very inefficient.

Figure 8:
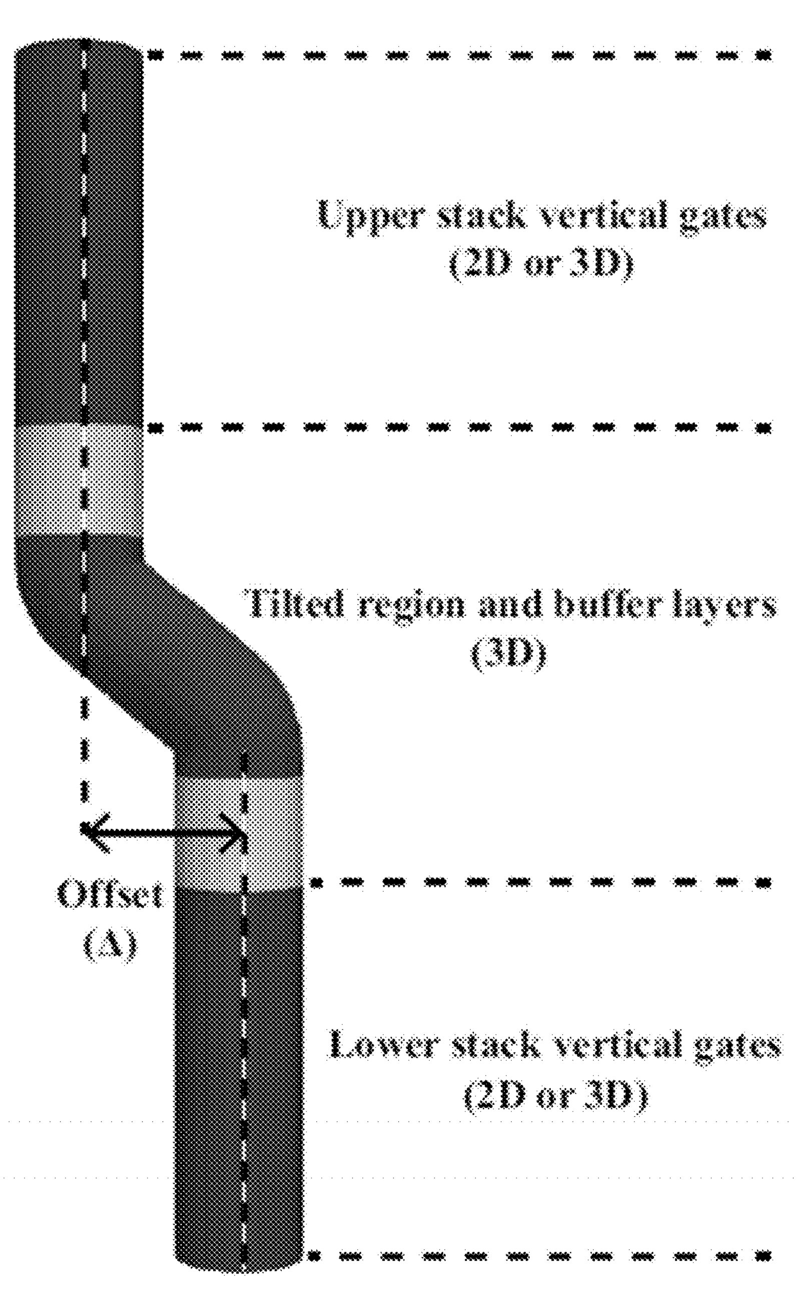
FIG. 8 is a schematic diagram showing three sub-devices obtained by dividing the entire device structure in order to simulate the vertical NAND structures of FIG. 7 by applying the method according to the present invention.
Figure 9:
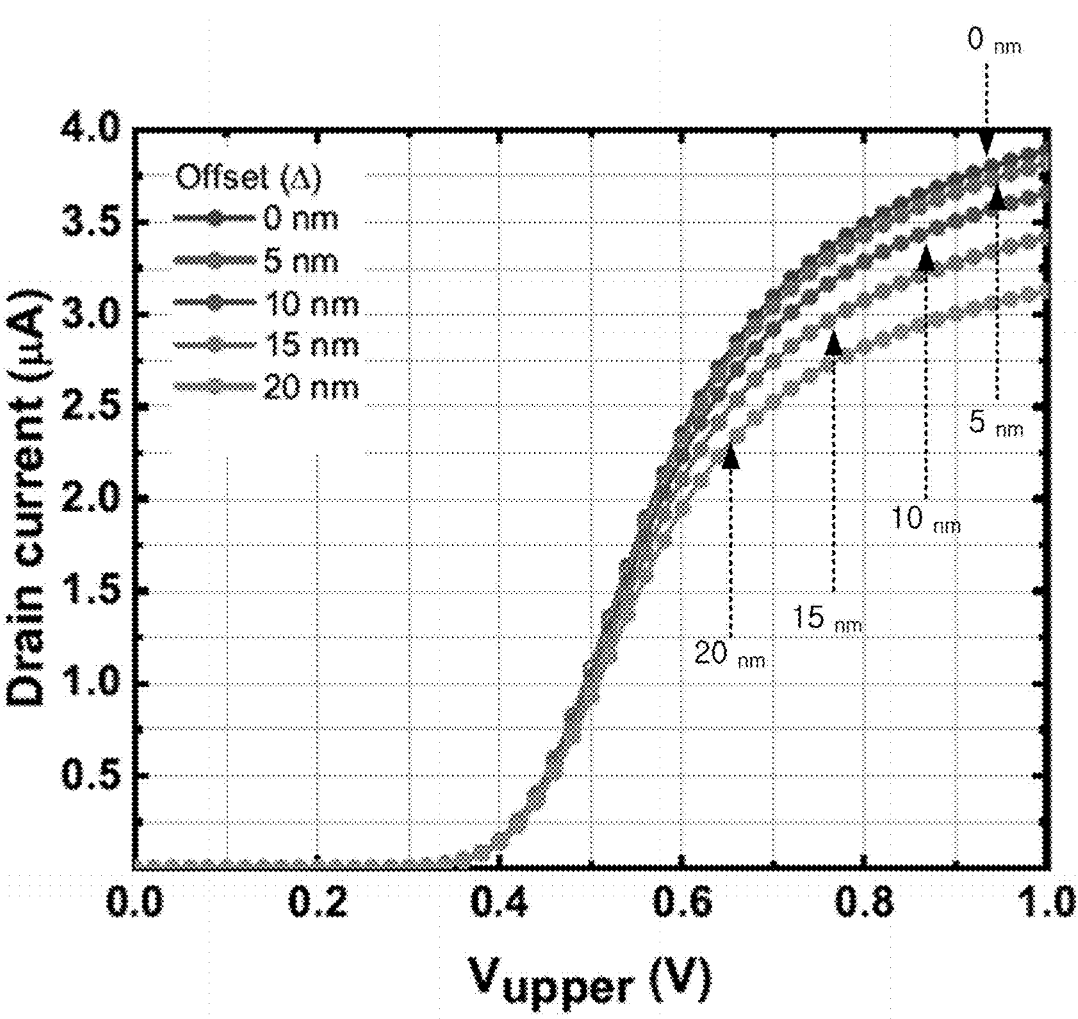
FIG. 9 is graphs showing current-voltage characteristics obtained by simulating the vertical NAND structures of FIGS. 7 and 8 using the method according to the present invention.

FIG. 8 is a schematic diagram showing three sub-devices obtained by dividing the entire device structure in order to simulate the vertical NAND structures of FIG. 7 by applying the method according to the present invention. FIG. 9 is graphs showing current-voltage characteristics obtained by simulating the vertical NAND structures of FIGS. 7 and 8 using the method according to the present invention. In FIG. 9, the x-axis is the gate voltage of the transistor assigned to the upper stack, and the y-axis is the drain current. Also, since the transistor of the lower stack is turned on with a sufficiently high voltage, the drain current changes only according to the gate voltage of the upper stack. At this time, as the offset increases, the length of the section in which the current should flow increases, and the current also decreases accordingly. Conventionally, only simulation of a 3D device structure, which takes a lot of time, was possible for simulation of such a structure. However, the method according to the present invention allows very efficient simulation of these structures. In particular, in the simulation method according to the present invention, the greater the size of the upper/lower stacks, the greater the efficiency.

In the above, the present invention has been mainly described with respect to preferred embodiments thereof, but this is merely an example and does not limit the present invention. Those of ordinary skill in the art to which the present invention pertains will appreciate that various modifications and applications not exemplified above are possible without departing from the essential features of the present invention. And, the differences related to these modifications and applications should be interpreted as being included in the scope of the present invention defined in the appended claims.

What is claimed is:

1. A 3D semiconductor device simulation system comprising;

a device structure file input module configured to receive a plurality of device structure files for a plurality of sub-devices obtained by dividing a semiconductor device to be simulated;

a connection relationship extraction module configured to extract connection relationships between the device structure files for the sub-devices;

an interface condition application module configured to apply interface conditions to interface points of the device structure files according to the extracted connection relationships; and a simulation module configured to simulate an operation of the semiconductor device using the device structure files for the sub-devices and the interface conditions at interface points of adjacent sub-devices, wherein the 3D semiconductor device simulation system is configured to simulate the semiconductor device using a plurality of device structure files for the sub-devices, and wherein the interface condition application module calculates equations for simulation for the sub-devices without considering the connection relationships, merges the calculated equations at interface points of interface surfaces for adjacent sub-devices to form a single equation, and solves the merged equations by applying the interface condition that all the interface point of the adjacent sub-devices have the same physical quantity.

2. The 3D semiconductor device simulation system of claim 1, wherein the semiconductor device is a three-dimensional (3D) cylindrical semiconductor device having a structure in which rotational symmetry is partially broken, and the plurality of device structure files input to the device structure file input module include at least one cylindrical device structure file and at least one 3D device structure file for the 3D cylindrical semiconductor device.

3. The 3D semiconductor device simulation system of claim 2, wherein the cylindrical device structure file is a device structure file for a sub-device with rotational symmetry of the 3D cylindrical semiconductor device, and the 3D device structure file is a device structure file for a sub-device without rotational symmetry of the 3D cylindrical semiconductor device.

4. The 3D semiconductor device simulation system of claim 1, wherein the connection relationships between the plurality of device structure files include information about the interface surfaces of the adjacent sub-devices, and are extracted by using the coordinate value information of the device structure files.

5. A 3D semiconductor device simulation method comprising the following steps:

(a) receiving a plurality of device structure files for a plurality of sub-devices obtained by dividing a semiconductor device to be simulated;

(b) extracting connection relationships between a plurality of device structure files for the sub-devices;

(c) applying interface conditions to interface points of the device structure files according to the extracted connection relationships; and (d) simulating an operation of the semiconductor device using the device structure files for the sub-devices and the interface conditions at interface points of adjacent sub-devices, wherein the 3D semiconductor device simulation method is configured to simulate the semiconductor device using a plurality of device structure files for the sub-devices, and wherein the step (d) comprises: calculating equations for simulation for the sub-devices without considering the connection relationships; merging the calculated equations at interface points of interface surfaces for adjacent sub-devices to form a single equation; and solving the merged equations by applying the interface condition that all the interface point of the adjacent sub-devices have the same physical quantity.

6. The 3D semiconductor device simulation method of claim 5, wherein the semiconductor device is a three-dimensional (3D) cylindrical semiconductor device whose rotational symmetry is partially broken, and the plurality of device structure files input to the device structure file input module include at least one cylindrical device structure file and at least one 3D device structure file for the 3D cylindrical semiconductor device.

7. The 3D semiconductor device simulation method of claim 6, wherein the cylindrical device structure file is a device structure file for a sub-device with rotational symmetry of the 3D cylindrical semiconductor device, and the 3D device structure file is a device structure file for a sub-device without rotational symmetry of the 3D cylindrical semiconductor device.

8. The 3D semiconductor device simulation method of claim 5, wherein the connection relationship between the plurality of device structure files include information about the interface surfaces of the adjacent sub-devices, and are extracted by using the coordinate value information of the device structure files.

9. A non-transitory computer-readable and non-volatile storage device recoding a program that implement the 3D semiconductor device simulation method according to claim 5 so as to be executable by a processor of the apparatus for simulating a single semiconductor device using a plurality of device structure files for a plurality of sub-devices.

10. A 3D semiconductor device simulation system comprising;

a device structure file input module configured to receive a plurality of device structure files for a plurality of sub-devices obtained by dividing a semiconductor device to be simulated;

a connection relationship extraction module configured to extract connection relationships between the device structure files for the sub-devices;

an interface condition application module configured to apply interface conditions to interface points of the device structure files according to the extracted connection relationships; and a simulation module configured to simulate an operation of the semiconductor device using the device structure files for the sub-devices and the interface conditions at interface points of adjacent sub-devices, wherein the 3D semiconductor device simulation system is configured to simulate the semiconductor device using a plurality of device structure files for the sub-devices, and wherein the semiconductor device is a three-dimensional (3D) cylindrical semiconductor device having a structure in which rotational symmetry is partially broken, and the plurality of device structure files input to the device structure file input module include at least one cylindrical device structure file and at least one 3D device structure file for the 3D cylindrical semiconductor device.

11. The 3D semiconductor device simulation system of claim 10, wherein the cylindrical device structure file is a device structure file for a sub-device with rotational symmetry of the 3D cylindrical semiconductor device, and the 3D device structure file is a device structure file for a sub-device without rotational symmetry of the 3D cylindrical semiconductor device.

* * * * *